Patented Nov. 25, 1924.

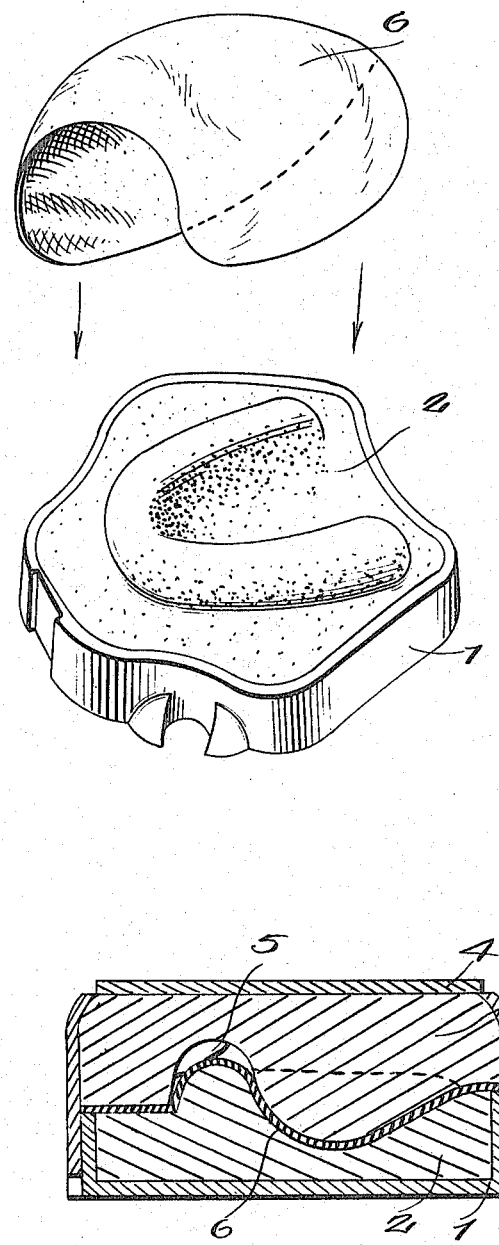

1,517,208

UNITED STATES PATENT OFFICE.

ROBERT HAMILTON GILLESPIE AND JAMES GLUVER VAUGHN, OF PINE BLUFF, ARKANSAS.

DENTAL DEVICE.

Application filed October 24, 1922. Serial No. 596,626.

*To all whom it may concern:*

Be it known that we, ROBERT H. GILLESPIE and JAMES G. VAUGHN, citizens of the United States, and residents of Pine Bluff, and county of Jefferson, and State of Arkansas, have invented certain new and useful Improvements in Dental Devices, of which the following is a specification.

This invention relates to means for and method of forming vulcanite dentures with dense smooth palatine surfaces, and it consists in the combinations, constructions and arrangements of parts and in the novel steps to be hereinafter described.

An object of our invention is to provide novel means and methods whereby rubber dental plates may be vulcanized on plaster model protected with rubber film to provide relatively dense smooth palatine surfaces dentures having smooth hard surfaces free from imperfections and roughness, on the palatine surfaces thereof.

Other objects and advantages will be apparent from the following description, when considered in conjunction with the accompanying drawings, in which—

Figure 1 is a perspective view of a facing sheet or rubber film which is adapted to be applied to a plaster model comprised in a mold.

Figure 2 is a perspective view showing a plaster model to which the rubber film sheet may be applied.

Figure 3 is a vertical sectional view of a mold embodying our invention, showing the parts of the mold separated.

As is well known, vulcanite dentures produced when rubber is vulcanized in contact with the surfaces of plaster models in a mold are frequently produced with rough and uneven palatine surfaces and are imperfect in that the material composing a denture is vulcanized on an imperfect model. These objectionable features are probably occasioned because of the presence in the material being vulcanized of ingredients which attack the contiguous surfaces of the plaster model and render such surfaces rough and uneven or pitted, whereby the dentures produced will be imperfect as stated.

In order to obviate the objectionable features just recited, our invention contemplates the provision of a protective facing or film on the exposed surface of each plaster model so that the plaster model of a mold will remain uninjured and so that the vulcanite dentures may be left clean and with smooth hard palatine surfaces after protective film has been removed.

The facing on the confronting or normally exposed surfaces of the plaster model may be in the form of a thin film of rubber or other elastic pliable material and adapted to be pressed against the surface of a plaster model to conformably contact over its entire area with the surface of the plaster model.

In the drawings, 1 denotes one of two complementary sections or parts of a metal case or frame in which a model 2 of plaster of Paris or like material is held. A model 3 of plaster of Paris or like material which is adapted to cooperate with the model 2 is held in a section or part 4 of a metal case or frame 4, the part or section 4 being complemental to the part or section 1. The parts described so far are ordinary and may vary considerably from the form illustrated. The models are cooperatively fashioned and the model 3 is provided with teeth 5 so that vulcanite dentures may be formed by vulcanizing rubber dental plates between the confronting or mating surfaces of the models 2 and 3 when the latter are held in a desired relation to each other.

A facing 6 of a thin sheet or film of rubber or other pliable material is provided on the outer or normally exposed surface of the cast 2. The rubber film 6 is of uniform thickness throughout its area and presents a smooth hard surface, being contiguous throughout its entire area to the underlying surface of the plaster model. The material of which the film 6 is formed must be such material as will not fuse to the rubber dental plates at temperatures sufficiently high to occasion a vulcanization of the rubber dental plates, and of a material which will not adhere to nor merge into the material of the rubber dental plate in contact therewith during the vulcanization of the dental plate. The so-called "rubber dam" of commerce has been found in actual practice to satisfy the requirements just mentioned for the film 6. The facing 6 may be secured to the underlying surface of the cast 2 in any suitable known manner.

From the foregoing description of the various parts of the device, the operation thereof may be readily understood. Rubber material from which the vulcanite denture is to be formed is placed between the plaster models in contiguous relation to the rubber films 6 on the faces of the model. The sections or parts of the case holding the models may be secured together in the usual or any preferred known manner and the rubber material between the models is vulcanized in the usual manner to produce vulcanite dentures. Since the plaster model 2 is protected by the facings or rubber film 6 from injurious ingredients contained in the denture forming material, while the latter is being vulcanized, vulcanite dentures having smooth hard palatine surfaces may be produced, the plaster model remaining uninjured during the vulcanizing operation.

We claim:—

1. The herein described method of forming dental molds for use in producing vulcanite dentures which consists in providing two complementary casts of plaster or like material and then providing upon the palatine face of the model a preformed sheet of protective material possessing inherent elasticity.

2. The herein described method of forming dental molds for use in producing vulcanite dentures which consists in providing two complementary casts of plaster or like material and then providing upon the palatine face of the model a preformed sheet of protective material possessing inherent elasticity, and having a smooth outer surface.

3. The herein described process of producing a smooth palatine surface on a vulcanite denture which comprises placing a thin smooth protective sheet of elastic material on a plaster model between the model and a vulcanizable body, heating the vulcanizable body to a temperature sufficient to cause the vulcanization thereof, and then stripping the vulcanized body from the protective sheet.

4. The herein described process of producing a smooth palatine surface on a vulcanite denture which comprises placing a thin smooth protective sheet of rubber on a plaster model between the model and a vulcanizable body, heating the vulcanizable body to a temperature sufficient to cause the vulcanization thereof, and then stripping the vulcanized body from the protective sheet.

5. In a mold for use in producing vulcanite dentures with smooth palatine surfaces, a plaster model, and a protective facing on the model, for spacing a vulcanizable body from the model, said facing comprising a thin sheet of elastic material adapted to be stripped from the vulcanizable body after the latter has been vulcanized in contact therewith.

ROBERT HAMILTON GILLESPIE.
JAMES GLUVER VAUGHN.